United States Patent [19]

Sukimoto et al.

[11] Patent Number: 4,809,743
[45] Date of Patent: Mar. 7, 1989

[54] FUEL PIPE DEVICE FOR MOTOR VEHICLES AND PROCESS FOR PRODUCING SAME

[75] Inventors: Minobu Sukimoto; Haruo Arima; Toshiyuki Yamada; Seijiro Taguchi, all of Sakai, Japan

[73] Assignee: Showa Aluminum Corporation, Osaka, Japan

[21] Appl. No.: 66,505

[22] Filed: Jun. 26, 1987

[30] Foreign Application Priority Data

Jun. 27, 1986 [JP] Japan ............................. 99287[U]
Apr. 1, 1987 [JP] Japan ............................. 81774

[51] Int. Cl.$^4$ ................................ F02M 55/02
[52] U.S. Cl. ........................ 137/561 A; 123/456; 123/468; 123/514; 29/157 T
[58] Field of Search ............ 137/561 R, 561 A; 29/157 T; 248/65; 123/456, 468, 514

[56] References Cited

U.S. PATENT DOCUMENTS

| | | | |
|---|---|---|---|
| 2,735,389 | 2/1956 | Wurzburger | 29/157 T X |
| 2,952,070 | 9/1960 | Veatch | 29/157 T X |
| 3,027,715 | 4/1962 | Morris | 248/65 X |
| 3,209,439 | 10/1965 | Arbogast | 29/157 T X |
| 3,216,092 | 11/1965 | Arbogast | 29/157 T X |
| 3,442,106 | 5/1969 | Gray, Jr. et al. | 29/157 T X |
| 3,451,113 | 6/1969 | Holden | 29/157 T |
| 3,789,819 | 2/1974 | Moulds | 123/456 X |
| 4,121,914 | 10/1978 | Kigawa et al. | 137/561 A X |
| 4,462,423 | 7/1984 | Franklin, Jr. | 137/561 A |
| 4,570,600 | 2/1986 | Atkins et al. | 123/456 X |
| 4,601,275 | 7/1986 | Weinand | 123/456 X |
| 4,662,391 | 5/1987 | Tolley | 137/561 A X |

Primary Examiner—John Rivell
Attorney, Agent, or Firm—Armstrong, Nikaido Marmelstein & Kubovcik

[57] ABSTRACT

A fuel pipe device for motor vehicles comprising a pipe main body having a plurality of holes formed in its peripheral wall and outward tubular projections each formed around each of the holes integrally with the wall for connecting branch pipes to the pipe main body. The device is produced by a process comprising bulging the peripheral wall of a pipe blank at each of the portions thereof to be connected to the branch pipes to form a tubular protrusion having a closed end, forming a hole in the center of the end closing wall of the protrusion, and bending the remaining portion of the end closing wall around the hole outward by burring flush with the peripheral wall of the protrusion to form the tubular projection. Alternatively, the device is produced by a process comprising forming a hole in a pipe blank at each of the portions thereof to be connected to the branch pipes, and bending the hole-defining portion of the blank outward by burring to form the projection. The device can be fabricated by a smaller number of production steps with greater ease than conventional fuel pipe devices.

9 Claims, 8 Drawing Sheets

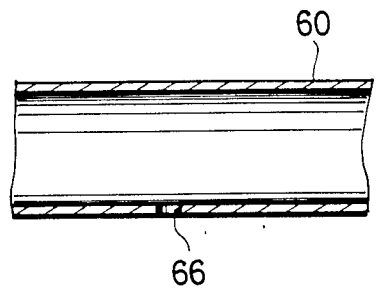
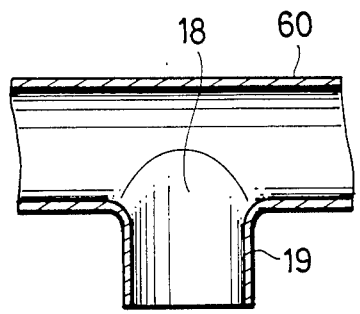
FIG.7(a)  FIG.7(b)
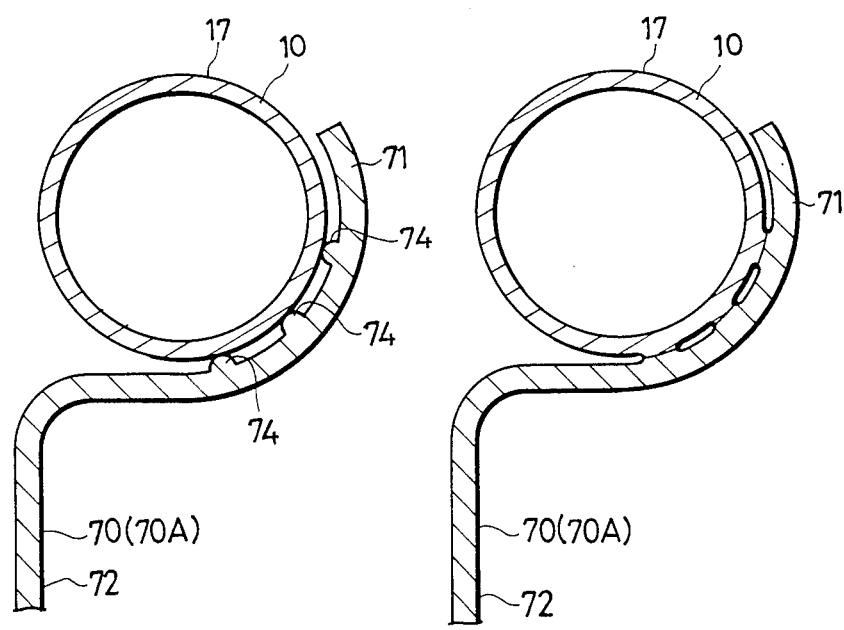
FIG.8(a)  FIG.8(b)

FUEL PIPE DEVICE FOR MOTOR VEHICLES AND PROCESS FOR PRODUCING SAME

BACKGROUND OF THE INVENTION

The present invention relates to a fuel pipe device for use in motor vehicles having a gasoline engine which is equipped, for example, with an electronically controllable fuel injection system.

The term "aluminum" as used herein and in the appended claims includes pure aluminum, commercial aluminum containing a small amount of impurities, and aluminum alloys. Further the term "wrought aluminum material" as used herein and in the claims refers to products prepared by plastic working.

Fuel pipe devices for motor vehicle gasoline engines equipped with an electronically controllable fuel injection system have branch pipes for supplying the fuel to injectors provided for the cylinders of the engine. Such fuel pipe devices heretofore used comprise a pipe main body having a plurality of holes formed in its peripheral wall and short tubular branch pipe connecting members welded or brazed to the outer peripheral surface of the wall each around each of the holes. However, the conventional device has the problem of being cumbersome to produce because the holes must be formed in the pipe main body and further because the branch pipe connecting members must be prepared separately from the pipe main body and joined to the body.

SUMMARY OF THE INVENTION

The main object of the present invention is to overcome the above problem and to provide a fuel pipe device which is easy to produce.

The present invention provides a fuel pipe device for motor vehicles which comprises a pipe main body having a plurality of holes formed in its peripheral wall and outward tubular projections each formed around each of the holes integrally with the peripheral wall for connecting branch pipes to the pipe main body. The device can be fabricated by a smaller number of production steps with greater ease than the conventional pipe device.

The present fuel pipe device is produced by a process comprising bulging the peripheral wall of a pipe blank at each of the portions thereof to be connected to the branch pipes to form a tubular protrusion having a closed end, forming a hole in the center of the end closing wall of the protrusion, and bending the remaining portion of the end closing wall around the hole outward by burring flush with the peripheral wall of the protrusion to form the tubular projection. With this process, the branch pipe connecting tubular projections are integrally formed with the peripheral wall of the pipe main body by deforming the wall, so that the device can be produced by a smaller number of steps with greater ease than like conventional devices. Since the tubular projection is formed by forming a hole in the center of the end closing wall of the protrusion on the pipe peripheral wall and thereafter outwardly bending the remaining portion of the end closing wall around the hole, the tubular projection obtained is uniform in wall thickness and is serviceable free of cracking. Alternatively, the fuel pipe device is produced by a process comprising forming a hole in a pipe blank at each of the portions thereof to be connected to the branch pipes, and bending the hole-defining portion of the blank outward by burring to form the tubular projection.

According to another mode of practicing the invention, the fuel pipe device further comprises a pipe device attaching bracket including a circular-arc portion extending along a portion of the outer peripheral surface of the main body peripheral wall over a predetermined length and a plate portion extending from the circular-arc portion, the circular-arc portion being fixedly joined to the pipe main body. The attaching bracket is fixed to the pipe main body by forming projections on the inner surface of the circular-arc portion and joining the circular-arc portion to the pipe main body by projection welding with the surface projections in contact with the pipe main body. Since the bracket is thus bonded to the pipe main body by projection welding, the pipe need to be heated only locally, consequently inhibiting occurrence of scale on the inner surface of the body to the greatest possible extent.

According to another embodiment of the invention, the fuel pipe device further comprises a flange fixed to one end of the pipe main body. The flange is fixed to the pipe main body by forming a helical or circular ridge on the inner periphery of a bored portion formed in the flange for inserting the main body end therein, inserting the end into the bored portion and diametrically enlarging this end to cause the ridge to bite into the outer peripheral surface of the end. This method requires no welding since the flange is fixed to the pipe main body by the enlarged portion formed at the end of the body. The mechanical work needed for this method is merely the simple procedure of diametrically enlarging the body end. The biting engagement of the ridge on the bore-defining peripheral surface in the outer periphery of the enlarged end of the main body gives sufficient strength to the joint between the flange and the pipe main body, preventing the flange from slipping off the pipe main body.

The present invention will be described in greater detail with reference to the accompanying drawings.

BRIEF DESCRIPTION OF THE DRAWINGS

FIGS. 7(a)–7(b) shows stepwise another process for forming the outward tubular projection on the main body along with the hole;

FIGS. 8(a) and 8(b) shows stepwise how to fix an attaching bracket to the pipe main body.

DESCRIPTION OF THE PREFERRED EMBODIMENTS

Figure 1:
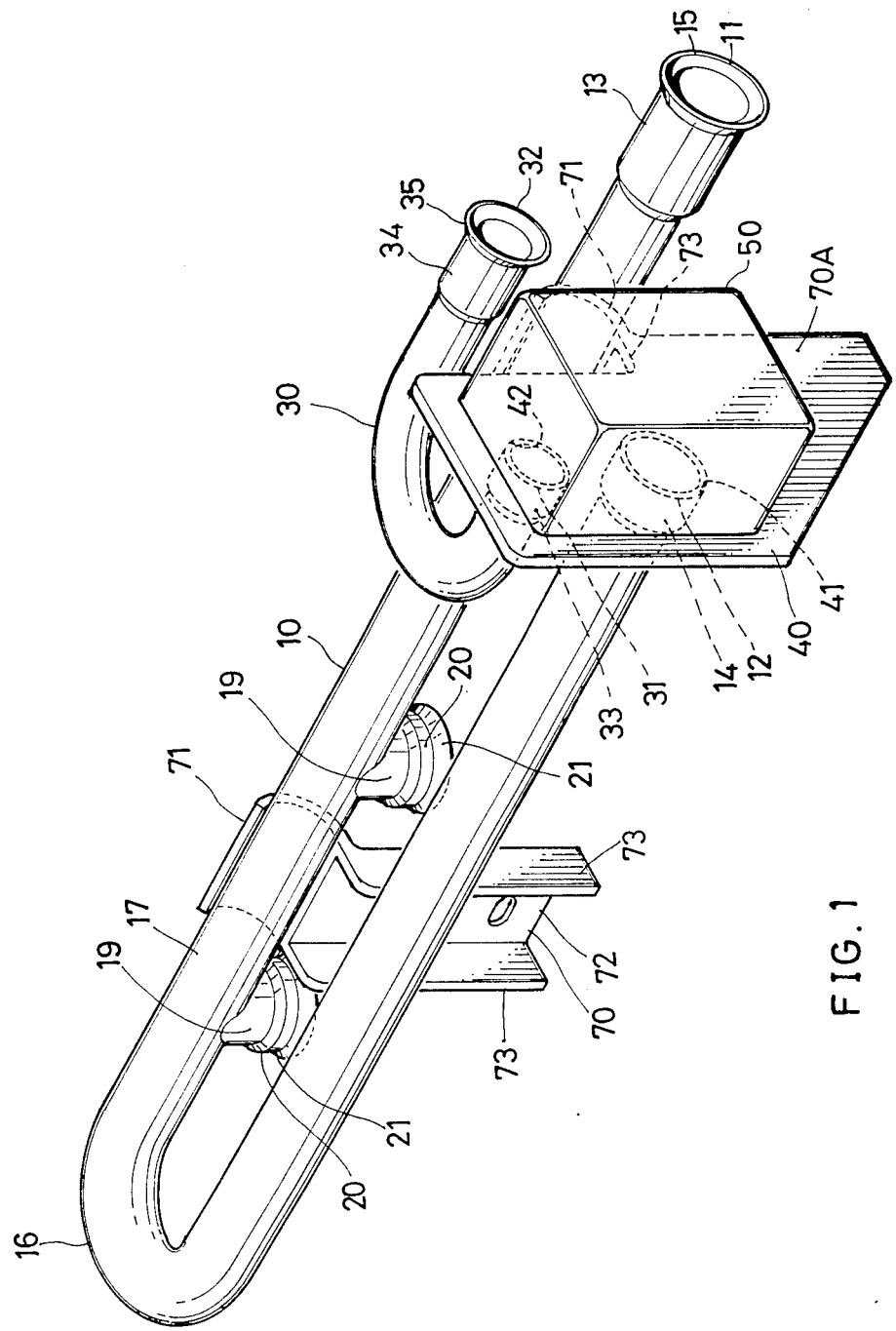
FIG. 1 is a perspective view showing a fuel pipe device in its entirety.
Figure 2:
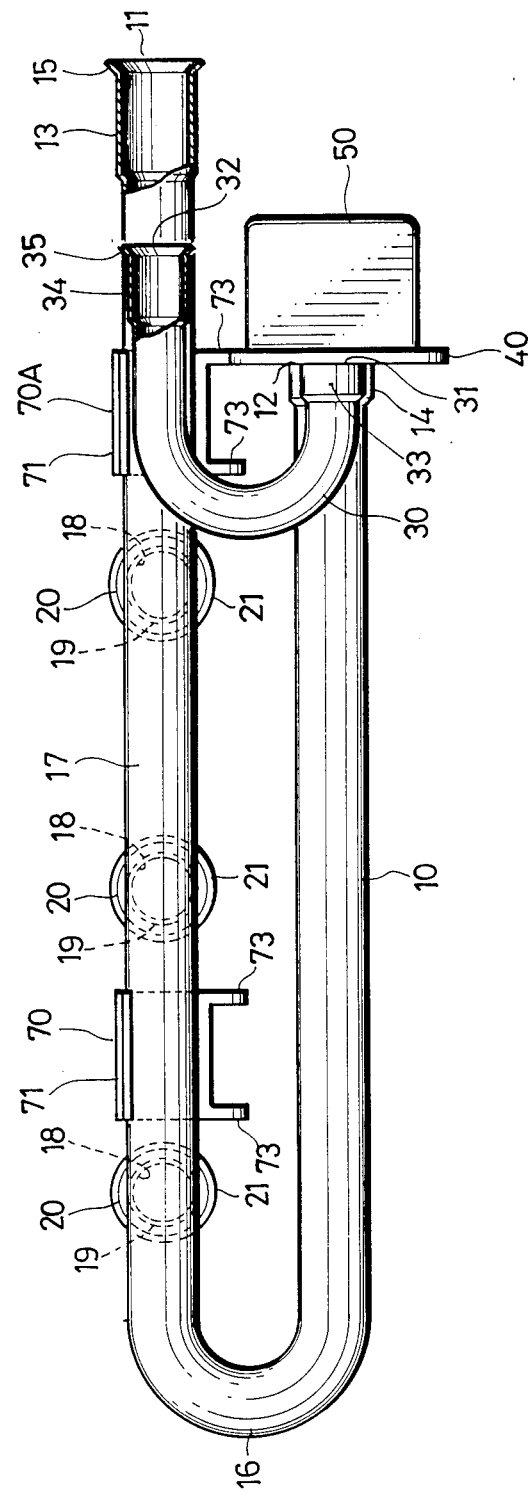
FIG. 2 is a plan view partly broken away and showing the same.
Figure 3:
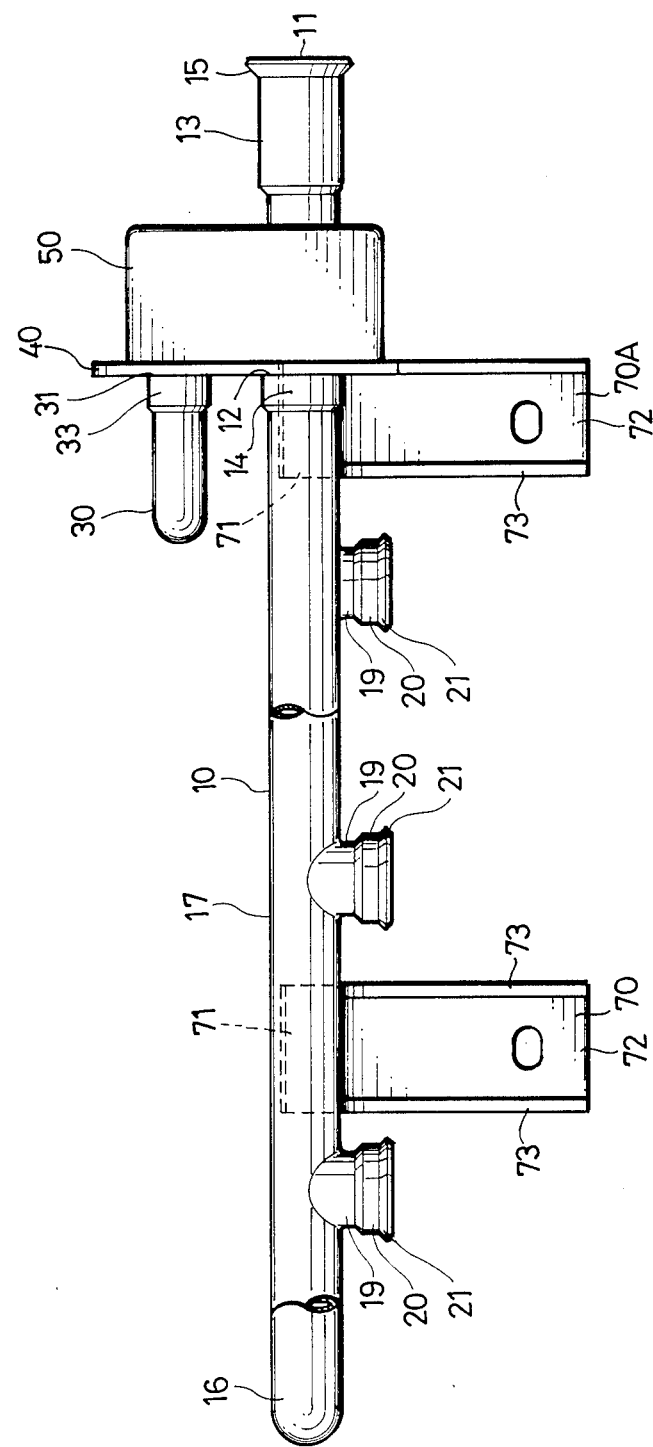
FIG. 3 is a front view partly broken away and showing the same.
Figure 4:
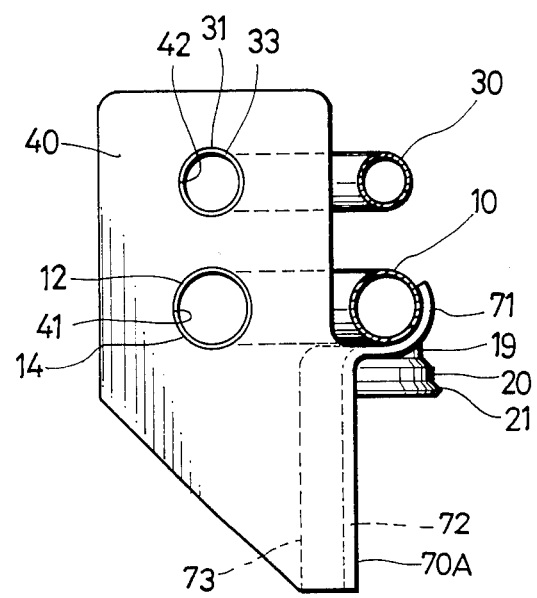
FIG. 4 is a right side elevation partly broken away and showing the same.

In the following description, the terms "front" and "rear" are used based on FIG. 2; the lower side thereof being referred to as "front," and the opposite side thereof as "rear." The terms "right" and "left" are used based on FIG. 2; the right-hand side and the left-hand side thereof being referred to as "right" and "left," respectively. The terms "upper" and "lower" are used based on FIGS. 3 and 4, and refer respectively to the upper and lower sides thereof.

With reference to FIGS. 1 to 4 showing a fuel pipe device in its entirety as an embodiment of the invention, the device comprises a fuel feed pipe main body 10 which is U-shaped when seen from above, and a fuel return pipe main body 30 which is also U-shaped when seen from above and smaller than the body 10. The two pipe main bodies 10, 30 have opposite end openings directed rightward. The return pipe main body 30 is disposed above the feed pipe main body 10 as spaced therefrom vertically at a predetermined distance. The rear open end of the body 10 serves as an inlet end 11 projecting rightward beyond its front open end, which serves as an outlet end 12. The front open end of the return pipe main body 30, which is positioned on the same vertical plane as the outlet end 12 of the body 10, serves as an inlet end 31. The rear open end of the return pipe main body 30, serving as an outlet end 32, is positioned to the right of the inlet end 31 of the body 30 and to the left of the inlet end 11 of the body 10. The inlet ends 11, 31 and the outlet ends 12, 32 of the two pipe main bodies 10, 30 have enlarged tubular portions 13, 33 and 14, 34, respectively. The enlarged tubular portion 13 at the inlet end 11 of the body 10 has a flare 15 at its extremity. One end of a pipe (not shown) for supplying a fuel from an unillustrated fuel tank is fixedly inserted in the tubular portion 13. The enlarged tubular portion 34 at the outlet end 32 of the body 30 has a flare 35 at its extremity. Inserted in this portion 34 is one end of a pipe (not shown) for returning an excess of fuel to the fuel tank. A flange 40 is fixed to both the oulet end 12 of the body 10 and the inlet end 31 of the body 30. The flange 40 is provided with a fuel supply regulator 50, through which the outlet end 12 communicates with the inlet end 31.

Extending from the inlet end 11 of the body 10 to its bent portion 16 is a straight portion 17, the peripheral wall of which is formed with three holes 18 as arranged longitudinally thereof at a spacing. Formed around each hole 18 is an outward tubular projection 19 integral with the wall for connecting a branch pipe to the body 10. The projection 19 is provided at its forward end with an enlarged tubular portion 20 having a flare 21 at its outer end.

Figure 5A:
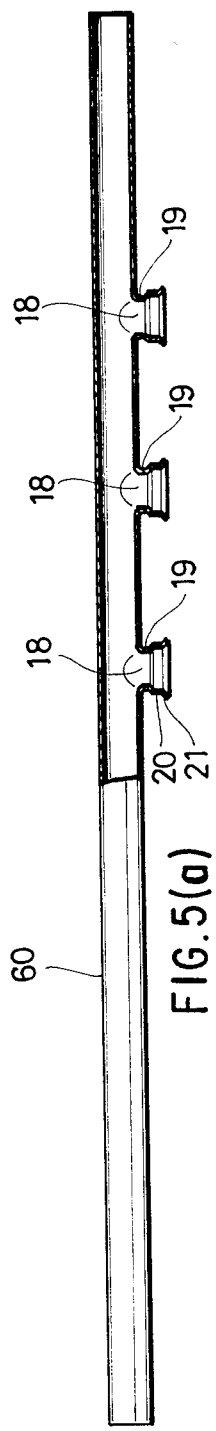
FIGS. 5(a)–5(c) shows a process for producing a fuel feed pipe main body stepwise.
Figure 5B:
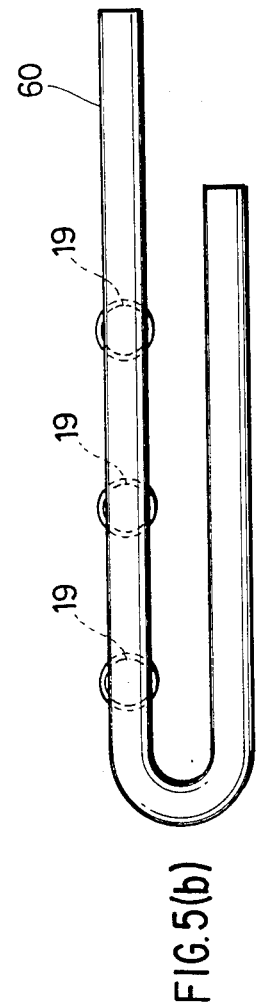
Figure 5C:
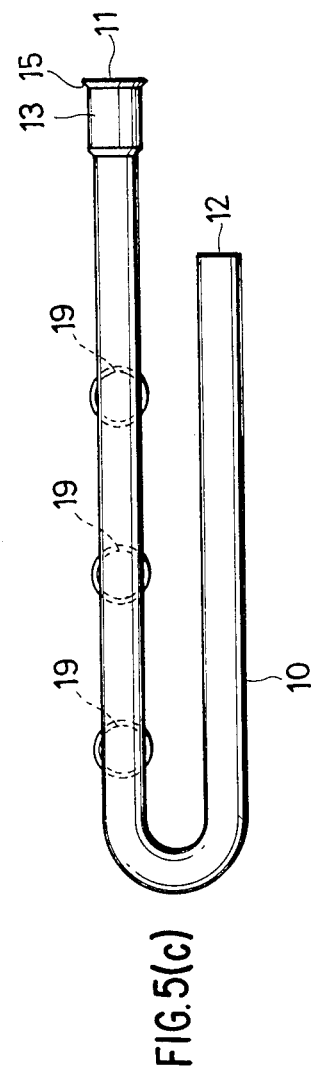
Figure 6A:
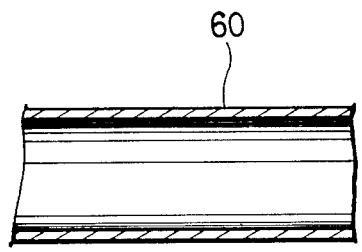
FIGS. 6(a)–6(e) shows stepwise a process for forming an outward tubular projection on the main body along with a hole.
Figure 6B:
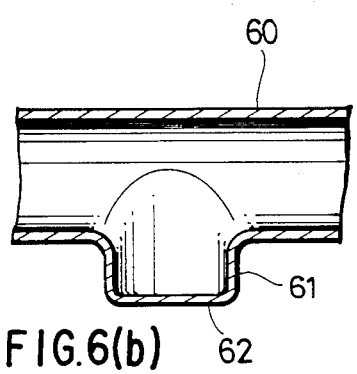
Figure 6C:
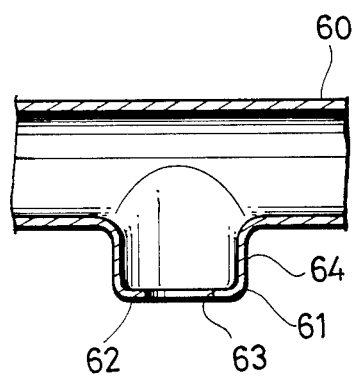
Figure 6D:
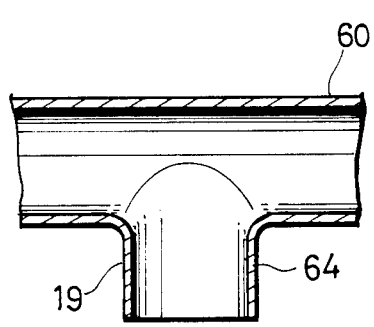
Figure 6E:
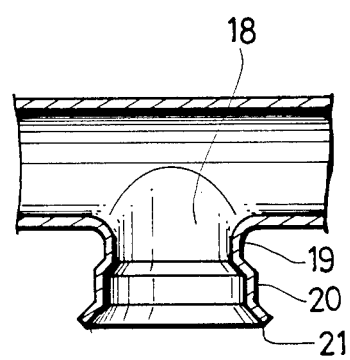

As shown in FIGS. 5 and 6, the fuel feed pipe main body 10 is prepared from a straight pipe 60, which is preferably made of wrought aluminum material although not limitative. To make the body 10, the hole 18 and the tubular projection 19 having the enlarged tubular portion 20 and the flare 21 are first formed at each of the portions of the straight pipe 60 to be connected to branch pipes as seen in FIG. 5(a). FIG. 6 shows how to form the hole 18 and the tubular projection 19. The peripheral wall of the pipe 60 shown in FIG. 6(a) is bulged to form a tubular protrusion 61 having a forward end closed with a wall 62 (see FIG. 6(b)). A hole 63 is then formed in the center of the end closing wall 62 of the protrusion 61 except at its peripheral edge portion as shown in FIG. 6(c). Subsequently as seen in FIG. 6(d), the remaining portion of the wall 62 defining the hole 63 is outwardly bent flush with the peripheral wall 64 of the protrusion 61 by burring, whereby the protrusion 61 is made into the tubular projection 19, with the hole 18 formed in the peripheral wall of the pipe 60. The enlarged tubular portion 20 is formed by diametrically enlarging the forward end of the projection 19 as seen in FIG. 6(e). The portion 20 is thereafter flared as at 21. The pipe 60 thus formed with the holes 18 and the tubular projections 19 is bent into a U-shape as shown in FIG. 5(b). Finally, the enlarged tubular portion 13 is formed at the pipe end serving as the inlet end 11, and the outer end of the portion 13 is flared as indicated at 15 (see FIG. 5(c)). In this way, the pipe main body 10 is prepared. The enlarged tubular portion 14 at the outlet end 12 is formed when the outlet end 12 is fixed to the flange 40 as will be described later.

Alternatively, the pipe main body 10 is prepared from a pipe 60 by the following process. A hole 66 smaller than the hole 18 is first formed in the peripheral wall of the pipe 60 at each of the portions thereof to be connected to branch pipes as seen in FIG. 7(a). Next, the portion around the hole 66 is outwardly bent by burring to form the outward tubular projection 19 and the hole 18 as seen in FIG. 7(b). The enlarged tubular portion 20 and flare 21 are thereafter formed in the same manner as above, the pipe 60 is bent to a U-shape, the enlarged tubular portion 13 is formed at the pipe end serving as the inlet end 11, and the portion 13 is flared as at 15.

Brackets 70 and 70A for attaching the fuel pipe device to an unillustrated intake manifold are secured to the fuel feed pipe main body 10 between and left tubular projection 19 and the central tubular projection 19, and between the right projection 19 and the inlet end 11. Each of the brackets 70, 70A comprises a circular-arc portion 71 extending along the outer surface of the peripheral wall of the body 10 over a predetermined length from a slightly upper rear portion thereof to the bottom thereof, and a plate portion 72 extending from the portion 71 downward. A wall 73 projecting forward from each side edge of the plate portion 72 extends over the entire length of the portion 72. The abovementioned flange 40 having the fuel supply regulator 50 attached thereto is integral with the wall 73 forwardly projecting from the right side edge of the bracket 70A. The circular-arc portions 71 of the brackets 70, 70A are welded to the pipe main body 10.

The fuel return pipe main body 30 is prepared by bending a straight pipe into a U-shape, forming the enlarged tubular portion 34 at the end thereof providing the outlet end 32 and flaring the outer end of the portion 34 as indicated at 35. The enlarged tubular portion 33 at the inlet end 31 of the body 30 is formed when the inlet end 31 is fixed to the flange 40 as will be described below.

The flange 40 has a bore 41 with the outlet end 12 of the pipe main body 10 inserted therein and a bore 42 having the inlet end 31 of the pipe main body 30 inserted therein and positioned above the bore 41. The inner peripheral surfaces of the bored portions 41, 42 are formed with helical or circular ridges 43, 44, respectively, as seen in FIG. 9. The ridges 43, 44 are in biting engagement with the outer peripheral surfaces of the enlarged tubular portions 14, 33 of the bodies 10, 30, respectively, whereby the pipe bodies 10, 30 are firmly fixed to the flange 40.

The fuel pipe device described above operates in the following manner. A fuel is introduced into the inlet end 11 of the fuel feed pipe main body 10 from the fuel tank via an unillustrated pipe and then dividedly admitted into unillustrated branch pipes, from which the fuel is sent to injectors. When the internal pressure of the feed pipe main body 10 builds up, the fuel supply regulator 50 operates, directing an excess of fuel into the fuel return pipe main body 30, from which the excessive fuel is returned to the fuel tank via an unillustrated pipe.

The fuel pipe device is produced in the following manner.

Prepared for the fabrication of the device are a U-shaped fuel feed pipe main body 10 having three holes 18, three tubular projections 19, each provided with an enlarged tubular portion 20 and a flare 21, and an enlarged tubular portion 13 and a flare at the outlet end 11; a U-shaped fuel return pipe main body 30 having an enlarged tubular portion 34 and a flare at the outlet end 32; a bracket 70 having a circular-arc portion 71, plate portion 72 and forwardly projecting walls 73; and a bracket 70A similar to bracket 70 and further having a flange 40 integral with one of the walls 73. Each of the brackets 70, 70A has a plurality of projections 74 formed on the inner surface of the circular-arc portion 71 integrally therewith (see FIG. 8(a)). The flange 40 integral with the bracket 70A is formed with two bores 41, 42 respectively having ridges 43 44 on the bore-defining inner peripheries (see FIG. 9(a)).

Figures 9A, 9B:
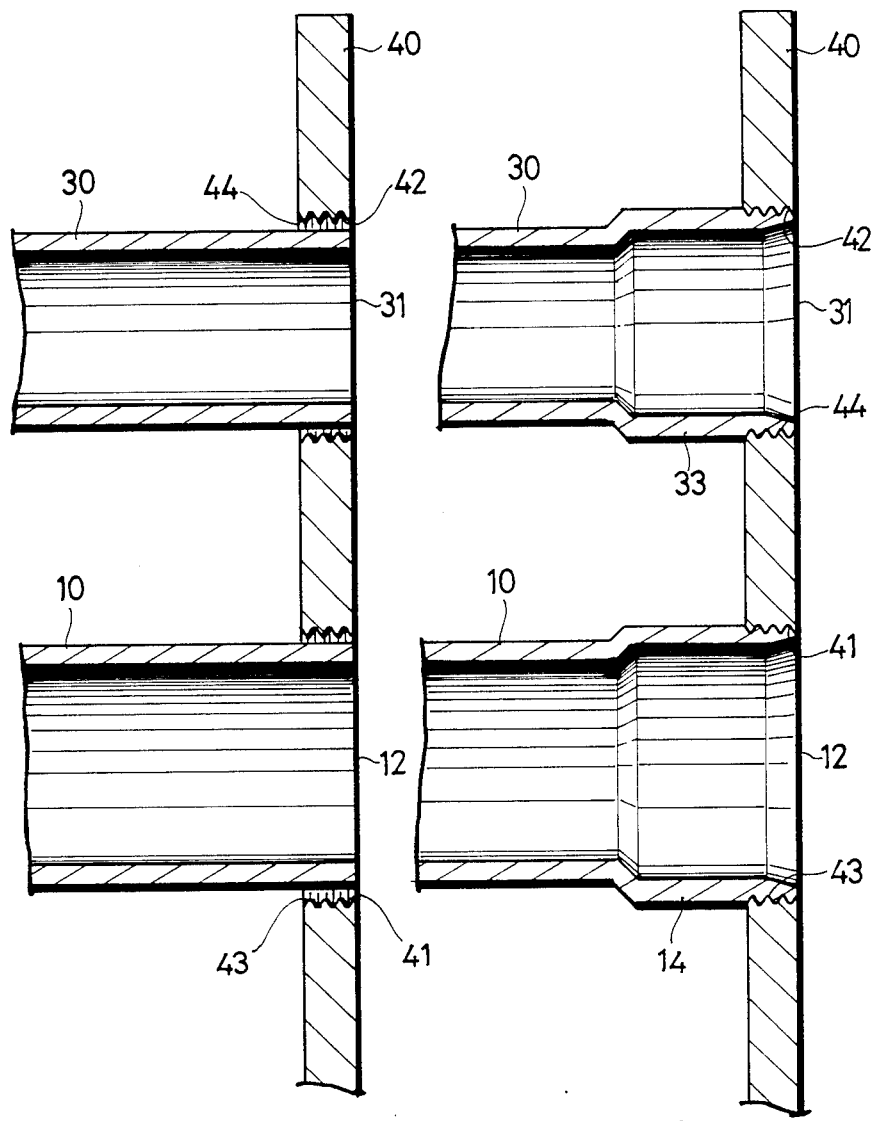
FIGS. 9(a) and 9(b) shows stepwise how to fix a flange to the pipe main body.

As shown in FIG. 8(a), the circular-arc portion 71 of each of the brackets 70, 70A is positioned on the peripheral wall outer surface of the straight portion 17 of the pipe main body 10 and bonded to the body 10 by projection welding with the projections 74 in contact with the outer surface. At this time, the flange 40 has inserted in its lower bore 41 the outlet end 12 of the body 10 as seen in FIG. 9(a). Next, the outlet end 12 of the pipe main body 10 is diametrically enlarged to form an enlarged tubular portion 14, causing the ridges 43 to bite into the outer peripheral surface of the portion 14, whereby the body 10 is fixed to the flange 40. The fuel return pipe main body 30 is placed above the pipe main body 10, with the inlet end 31 inserted in the upper bore 42 in the flange 40 as shown in FIG. 9(a). The inlet end 31 of the body 30 is then diametrically enlarged to form an enlarged tubular portion 33, causing the ridges 44 to bite into the outer peripheral surface of the portion 33, whereby the body 30 is fixed to the flange 40 (see FIG. 9(b)). In this way, the fuel pipe device is obtained.

The present invention may be embodied differently without departing from the spirit and basic features of the invention. Accordingly the embodiments herein disclosed are given for illustrative purposes only and are in no way limitative. It is to be understood that the scope of the invention is defined by the appended claims rather than by the specification and that all alterations and modifications within the definition and scope of the claims are included in the claims.

What is claimed is:

1. A fuel pipe device for injectors of a motor vehicle having a return passage for an excessive fuel, said fuel pipe device comprising:

a U-shaped fuel feed main body having first and second straight tubular portions, a plurality of outwardly open tubular projections being provided at said first straight tubular portion, each of said outwardly open tubular projections being connected to each of said injectors;

a U-shaped fuel return pipe main body having a pair of straight tubular portions; and a fuel supply regulator directly connecting said second straight tubular portion and one of said pair of straight tubular portions in a manner such that all said straight tubular portions extend toward a same direction, wherein said fuel supply regulator is adapted to work in response to the fluctuation in the pressure within said fuel feed main body.

2. The fuel pipe device of claim 1, wherein said fuel feed pipe main body is made of wrought aluminum material.

3. The fuel pipe device of claim 1, wherein each of said outwardly open tubular projections is provided with an enlarged tubular portion at the distal end thereof.

4. The fuel pipe device of claim 1, further including an attaching bracket having a semi-circular plate directly arising therefrom for supporting said first straight tubular portion.

5. The fuel pipe device of claim 1 further including a flange provided with two bores therein, said first straight tubular portion and one of said pair of straight tubular portions being inserted into said two bores respectively.

6. The fuel pipe device of claim 5, wherein each of said bores is provided with internal ridges.

7. The fuel pipe device of claim 6, wherein said ridges are helical.

8. The fuel pipe device of claim 6, wherein said ridges are circular.

9. The fuel pipe device of claim 5, wherein each of said straight tubular portion and one of said pair of straight tubular portions has an enlarged diameter portion in the proximity of said flange.

* * * * *